US012308866B2

(12) United States Patent
Kitajima et al.

(10) Patent No.: US 12,308,866 B2
(45) Date of Patent: May 20, 2025

(54) RADIO FREQUENCY MODULE AND COMMUNICATION DEVICE

(71) Applicant: Murata Manufacturing Co., Ltd., Kyoto (JP)

(72) Inventors: Hiromichi Kitajima, Kyoto (JP); Takanori Uejima, Kyoto (JP); Naoya Matsumoto, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 18/763,282

(22) Filed: Jul. 3, 2024

(65) Prior Publication Data

US 2024/0356570 A1    Oct. 24, 2024

Related U.S. Application Data

(63) Continuation of application No. 18/162,834, filed on Feb. 1, 2023, now Pat. No. 12,068,764, which is a continuation of application No. PCT/JP2021/015455, filed on Apr. 14, 2021.

(30) Foreign Application Priority Data

Aug. 13, 2020   (JP) .................................. 2020-136575

(51) Int. Cl.
*H04B 1/00*    (2006.01)
*H04B 1/10*    (2006.01)
*H04B 1/40*    (2015.01)

(52) U.S. Cl.
CPC ......... *H04B 1/0067* (2013.01); *H04B 1/1018* (2013.01); *H04B 1/40* (2013.01)

(58) Field of Classification Search
CPC .......... H04B 1/0067; H04B 1/40; H04B 1/00; H04B 1/0057; H04B 1/006; H04B 1/1018; H04B 1/38; H04B 1/44
See application file for complete search history.

(56) References Cited

U.S. PATENT DOCUMENTS

| 8,849,362 | B1 | 9/2014 | Saji et al. |
| 10,548,223 | B2* | 1/2020 | Frenette .................. H03H 7/06 |
| 10,957,668 | B2* | 3/2021 | Li ........................... H01L 24/29 |

(Continued)

FOREIGN PATENT DOCUMENTS

| JP | 2015-111747 A | 6/2015 |
| WO | 2018/110381 A1 | 6/2018 |

(Continued)

OTHER PUBLICATIONS

International Search Report for PCT/JP2021/015455 dated Jul. 13, 2021.

*Primary Examiner* — Dac V Ha
(74) *Attorney, Agent, or Firm* — McDonald Hopkins LLC

(57) ABSTRACT

A radio frequency module includes: a module substrate having a main surface; a conductive member to partition the main surface into regions in a plan view of the main surface, and being set to ground electric potential; a switch disposed in one of the regions and connected to an antenna connection terminal; a power amplifier disposed in one of the regions and connected to the antenna connection terminal via the switch; and a low-noise amplifier disposed in one of the regions and connected to the antenna connection terminal via the switch.

19 Claims, 11 Drawing Sheets

(56) References Cited

U.S. PATENT DOCUMENTS

| | | |
|---|---|---|
| 10,980,106 B2 * | 4/2021 | Lobianco ............ H01L 23/481 |
| 11,069,961 B2 | 7/2021 | Sampo et al. |
| 2007/0202832 A1 | 8/2007 | Takikawa et al. |
| 2019/0230794 A1 | 7/2019 | Frenette et al. |
| 2021/0152202 A1 | 5/2021 | Uejima |
| 2021/0152210 A1 | 5/2021 | Uejima |
| 2021/0159133 A1 | 5/2021 | Aikawa et al. |
| 2022/0393349 A1 * | 12/2022 | Lee ..................... H04B 7/0413 |

FOREIGN PATENT DOCUMENTS

| | | |
|---|---|---|
| WO | 2019/240095 A1 | 12/2019 |
| WO | 2019/240096 A1 | 12/2019 |
| WO | 2019/240097 A1 | 12/2019 |
| WO | 2020/066380 A1 | 4/2020 |

* cited by examiner

RADIO FREQUENCY MODULE AND COMMUNICATION DEVICE

CROSS REFERENCE TO RELATED APPLICATION

This is a continuation of U.S. patent application Ser. No. 18/162,834 filed on Feb. 1, 2023, which is a continuation of International Application No. PCT/JP2021/015455 filed on Apr. 14, 2021 which claims priority from Japanese Patent Application No. 2020-136575 filed on Aug. 13, 2020. The contents of these applications are incorporated herein by reference in their entireties.

BACKGROUND ART

Technical Field

The present disclosure relates to a radio frequency module and a communication device.

In a mobile communication device such as a cellular phone, in particular, a disposition configuration of circuit elements constituting a radio frequency front-end circuit has become complicated along with the progress of supporting multiband.

Patent Document 1 discloses a communication module including a shield wall formed to partition a mounting region of either or both of a system portion and a power supply circuit portion from a mounting region of a radio frequency processing portion. With this, it is possible to suppress the intrusion of noise from a system portion and a power supply circuit portion into a radio frequency processing portion, and to reduce a communication module in size.

Patent Document 1: Japanese Unexamined Patent Application Publication No. 2015-111747

BRIEF SUMMARY

However, in the related art described above, the inflow of noise into a radio frequency signal cannot be sufficiently suppressed in some cases.

The present disclosure provides a radio frequency module and a communication device capable of suppressing the inflow of noise into a radio frequency signal.

The radio frequency module according to an aspect of the present disclosure includes: a module substrate having a main surface; a conductive member to partition the main surface into a first region, a second region, and a third region in a plan view of the main surface, and being set to ground electric potential; a first switch disposed in the second region and connected to an antenna connection terminal; a power amplifier disposed in the first region and connected to the antenna connection terminal via the first switch; and a low-noise amplifier disposed in the third region and connected to the antenna connection terminal via the first switch.

Further, the communication device module according to an aspect of the present disclosure includes a signal processing circuit configured to process a radio frequency signal, and the radio frequency module according to the aspect described above configured to transfer the radio frequency signal processed by the signal processing circuit.

According to the present disclosure, the inflow of noise into a radio frequency signal may be suppressed.

DETAILED DESCRIPTION

Figure 1:
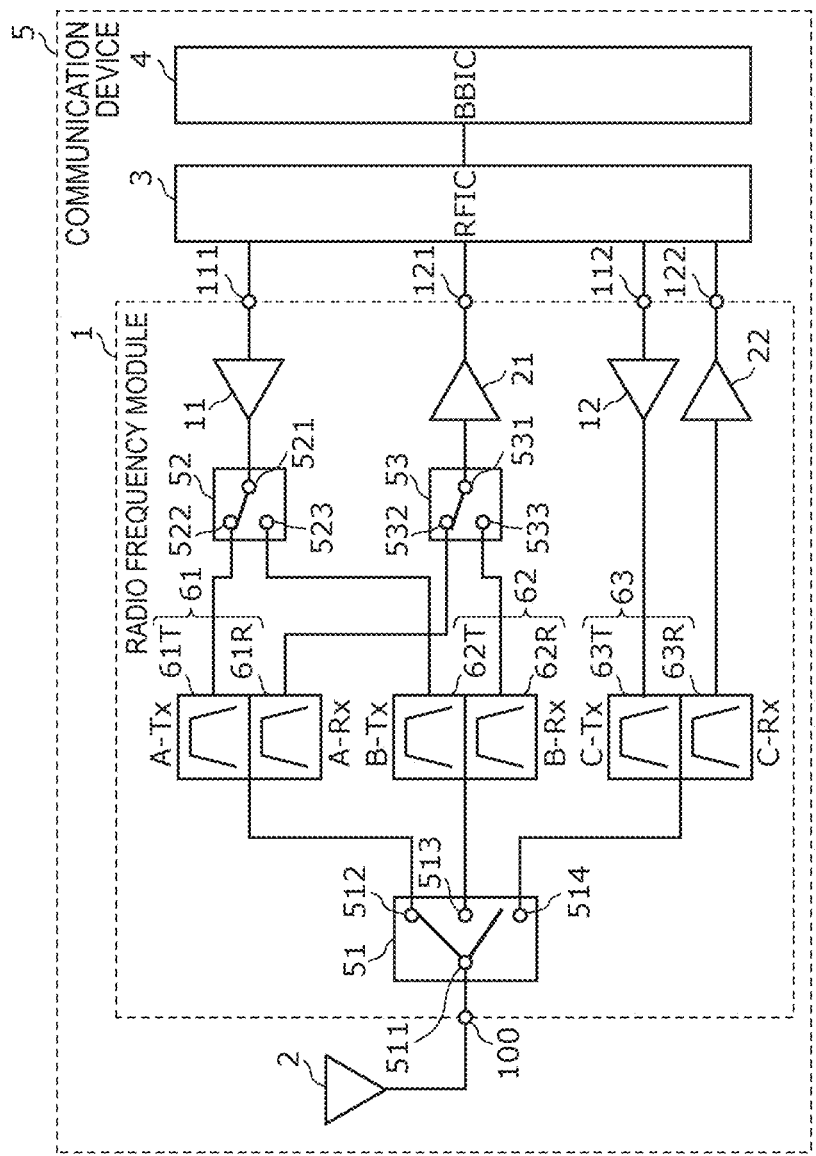
FIG. 1 is a circuit configuration diagram of a radio frequency module and a communication device according to an embodiment.

Hereinafter, a radio frequency module and a communication device according to an embodiment of the present disclosure will be described in detail with reference to the drawings. Note that each of the embodiments below describes a specific example of the present disclosure. Accordingly, a numerical value, shape, material, constituent, disposition and connection mode of a constituent, and the like illustrated in the following embodiments are an example, and are not intended to limit the present disclosure. Therefore, among constituents in the following embodiments, a constituent not stated in an independent claim is described as an optional constituent.

Further, each drawing is a schematic diagram, and is not necessarily exactly illustrated. Accordingly, for example, scales and the like do not necessarily coincide with each other in the drawings. Further, in the drawings, substantially the same configurations are denoted by the same reference signs, and a redundant description thereof will be omitted or simplified.

Further, in the present description, terms indicating a relationship between elements such as parallel or perpendicular, terms indicating a shape of an element such as a rectangle or a straight line, and a numerical range are not an expression representing only an exact meaning, but an expression representing substantially of an equivalent range, that is, an expression including a difference of several percent, for example.

Further, in the present description, terms "above" and "below" do not indicate an upward direction (vertically upward) and a downward direction (vertically downward) in absolute spatial recognition, but are used as terms defined by a relative positional relationship based on a stacking order in a stack configuration. Further, the terms "above" and "below" are applied not only to a case that two constituents are disposed apart from each other and another constituent is present between the two constituents, but also to a case that two constituents are disposed in close contact with each other and the two constituents are in contact with each other.

Further, in the present description and the drawings, an x-axis, a y-axis, and a z-axis represent three axes of a three dimensional orthogonal coordinate system. When a shape of a module substrate in a plan view is rectangular, the x-axis is a direction parallel to a first side of the rectangular shape and the y-axis is a direction parallel to a second side orthogonal to the first side. The z-axis is a thickness direction of a module substrate. Note that, in the present description, the "thickness direction" of a module substrate refers to a direction perpendicular to a main surface of the module substrate.

Further, in the present description, "connected" includes not only a case of being directly connected by a connection terminal and/or a wiring conductor but also a case of being electrically connected via another circuit element. Further, "connected between A and B" means being connected to both A and B between A and B.

Further, in the component disposition of the present disclosure, a "plan view of a module substrate" or a "plan view of a main surface of a module substrate" means that an object is viewed by orthographic projection onto an xy plane from a z-axis positive side. Further, a "distance between A and B in a plan view of a module substrate" means the length of a line segment connecting a representative point in the region of A and a representative point in the region of B orthographically projected on an xy plane. Here, as a representative point, a center point of a region, a point closest to a counterpart region, or the like may be used, but a representative point is not limited thereto.

Further, "a component is disposed on a substrate" includes not only a case that a component is disposed on a substrate in a state of being in contact with the substrate, but also a case that a component is disposed above a substrate without necessarily being in contact with the substrate (for example, a case that a component is stacked on another component disposed on a substrate), and a case that part or all of a component is embedded in a substrate. Furthermore, "a component is disposed on a main surface of a substrate" includes not only a case that a component is disposed on a main surface in a state of being in contact with the main surface of a substrate, but also a case that a component is disposed above a main surface without necessarily being in contact with the main surface, and a case that part of a component is embedded in a substrate from a main surface side. "A is disposed between B and C" means that at least one of multiple line segments connecting any point in B and any point in C passes through A.

Further, unless otherwise specified, ordinal numbers such as "first", "second", and the like in the present description do not mean the number or order of constituents, but are used to avoid confusion of constituents of the same type and to distinguish them.

EMBODIMENT

[1. Circuit Configuration of Radio Frequency Module and Communication Device]

A circuit configuration of a radio frequency module and a communication device according to an embodiment will be described with reference to FIG. 1. FIG. 1 is a circuit configuration diagram of a radio frequency module 1 and a communication device 5 according to the present embodiment.

[1-1. Circuit Configuration of Communication Device]

First, a circuit configuration of the communication device 5 will be described. The communication device 5 is a device used in a communication system, and is a mobile terminal such as a smartphone, a tablet computer, or the like, for example. As illustrated in FIG. 1, the communication device 5 includes the radio frequency module 1, an antenna 2, an RFIC 3, and a BBIC 4.

The radio frequency module 1 transfers a radio frequency signal between the antenna 2 and the RFIC 3. The internal configuration of the radio frequency module 1 will be described later.

The antenna 2 is connected to an antenna connection terminal 100 of the radio frequency module 1, transmits a radio frequency signal outputted from the radio frequency module 1, and receives a radio frequency signal from outside and outputs the radio frequency signal to the radio frequency module 1.

The RFIC 3 is a signal processing circuit to process a radio frequency signal transmitted and received by the antenna 2. Specifically, the RFIC 3 performs signal processing on a radio frequency reception signal inputted via a reception path of the radio frequency module 1 by down-conversion or the like, and outputs a reception signal generated by the signal processing to the BBIC 4. Further, the RFIC 3 performs signal processing on a transmission signal inputted from the BBIC 4 by up-conversion or the like, and outputs a radio frequency transmission signal generated by the signal processing to a transmission path of the radio frequency module 1.

Furthermore, the RFIC 3 includes a controller to control a switch, an amplifier, and the like included in the radio frequency module 1. Some or all of the functions of the controller in the RFIC 3 may be provided outside the RFIC 3, such as in the BBIC 4 or the radio frequency module 1, for example.

The BBIC 4 is a baseband signal processing circuit to perform signal processing using an intermediate frequency band of a lower frequency relative to a radio frequency signal transferred by the radio frequency module 1. For signals processed in the BBIC 4, an image signal for image display and/or an audio signal for phone conversation via a speaker is used, for example.

Note that, in the communication device 5 according to the present embodiment, the antenna 2 and the BBIC 4 are optional constituents.

[1-2. Circuit Configuration of Radio Frequency Module]

Next, a circuit configuration of the radio frequency module 1 will be described. As illustrated in FIG. 1, the radio frequency module 1 includes power amplifiers 11 and 12, low-noise amplifiers 21 and 22, switches 51 to 53, duplexers 61 to 63, the antenna connection terminal 100, radio frequency input terminals 111 and 112, and radio frequency output terminals 121 and 122.

The antenna connection terminal 100 is connected to the antenna 2.

Each of the radio frequency input terminals 111 and 112 is a terminal for receiving a radio frequency transmission signal from the outside of the radio frequency module 1. In the present embodiment, the radio frequency input terminal 111 is a terminal for receiving a transmission signal in communication bands A and B from the RFIC 3. The radio frequency input terminal 112 is a terminal for receiving a transmission signal in a communication band C from the RFIC 3.

Each of the radio frequency output terminals 121 and 122 is a terminal for providing a radio frequency reception signal to the outside of the radio frequency module 1. In the present embodiment, the radio frequency output terminal 121 is a terminal for providing a reception signal in the communication bands A and B to the RFIC 3. The radio frequency output terminal 122 is a terminal for providing a reception signal in the communication band C to the RFIC 3.

The communication band means a frequency band defined in advance for a communication system by a standardization organization or the like (3rd Generation Partnership Project (3GPP), Institute of Electrical and Electronics Engineers (IEEE), and the like, for example).

Here, the communication system means a communication system constructed using radio access technology (RAT). As the communication system, a 5th Generation New Radio (5GNR) system, a Long Term Evolution (LTE) system, a Wireless Local Area Network (WLAN) system, or the like may be used, for example, but the communication system is not limited thereto.

The communication band A is an example of a first communication band. The communication band B is an example of a second communication band. The communication band C is an example of a third communication band. The communication bands A to C are communication bands mutually different from each other. In the present embodiment, a communication band for frequency division duplex (FDD) is used as each of the communication bands A to C. More specifically, as each of the communication bands A to C, there is used band B1, band B2, band B3, or band B7 for LTE, or band n1, band n2, band n3, or band n7 for 5GNR, but the communication bands A to C are not limited thereto.

Alternatively, a communication band for time division duplex (TDD) may be used as at least one of the communication bands A to C. More specifically, as at least one of the communication bands A to C, band B32, band B39, band B40, or band B41 for LTE, or band n39, band n40, or band n41 for 5GNR may be used.

The power amplifier 11 can amplify radio frequency signals in the communication bands A and B. An input terminal of the power amplifier 11 is connected to the radio frequency input terminal 111, and an output terminal of the power amplifier 11 is connected to transmission filters 61T and 62T via the switch 52.

The power amplifier 12 can amplify a radio frequency signal in the communication band C. An input terminal of the power amplifier 12 is connected to the radio frequency input terminal 112, and an output terminal of the power amplifier 12 is connected to a transmission filter 63T.

The configuration of each of the power amplifiers 11 and 12 is not particularly limited. For example, the power amplifiers 11 and/or 12 may have a single-stage configuration or a multi-stage configuration. For example, the power amplifiers 11 and/or 12 may include multiple amplifying elements in a cascading connection. Further, the power amplifiers 11 and/or 12 may convert a radio frequency signal into a differential signal (that is, a complementary signal) and amplify the differential signal. The power amplifiers 11 and/or 12 described above are referred to as differential amplifiers in some cases.

The low-noise amplifier 21 can amplify radio frequency signals in the communication bands A and B with low-noise. An input terminal of the low-noise amplifier 21 is connected to reception filters 61R and 62R via the switch 53, and an output terminal of the low-noise amplifier 21 is connected to the radio frequency output terminal 121.

The low-noise amplifier 22 can amplify a radio frequency signal in the communication band C with low-noise. An input terminal of the low-noise amplifier 22 is connected to a reception filter 63R, and an output terminal of the low-noise amplifier 22 is connected to the radio frequency output terminal 122.

The configuration of each of the low-noise amplifiers 21 and 22 is not particularly limited. For example, the low-noise amplifiers 21 and/or 22 may have either a single-stage configuration or a multi-stage configuration, or may be a differential amplifier.

The duplexer 61 allows a radio frequency signal in the communication band A to pass through. The duplexer 61 transfers a transmission signal and a reception signal in the communication band A by an FDD method. The duplexer 61 includes the transmission filter 61T and the reception filter 61R.

The transmission filter 61T is an example of a first filter. One end of the transmission filter 61T is connected to the antenna connection terminal 100 via the switch 51, and the other end is connected to the output terminal of the power amplifier 11. Specifically, the other end of the transmission filter 61T is connected to the output terminal of the power amplifier 11 via the switch 52. The transmission filter 61T has a pass band including at least part of the communication band A. Specifically, the transmission filter 61T has a pass band including an up-link operation band of the communication band A. With this, the transmission filter 61T allows a radio frequency signal in the up-link operation band of the communication band A, in the radio frequency signals amplified by the power amplifier 11, to pass through.

Note that the up-link operation band means part of a communication band designated for an up-link. In the radio frequency module 1, the up-link operation band means a transmission band.

The reception filter 61R is an example of a second filter. One end of the reception filter 61R is connected to the antenna connection terminal 100 via the switch 51, and the other end is connected to the input terminal of the low-noise amplifier 21. Specifically, the other end of the reception filter 61R is connected to the input terminal of the low-noise amplifier 21 via the switch 53. The reception filter 61R has a pass band including at least part of the communication band A. Specifically, the reception filter 61R has a pass band including a down-link operation band of the communication band A. With this, the reception filter 61R allows a radio frequency signal in the down-link operation band of the communication band A, in the radio frequency signals inputted from the antenna connection terminal 100, to pass through.

Note that the down-link operation band means part of a communication band designated for a down-link. In the radio frequency module 1, the down-link operation band means a reception band.

The duplexer 62 allows a radio frequency signal in the communication band B to pass through. The duplexer 62 transfers a transmission signal and a reception signal in the communication band B by an FDD method. The duplexer 62 includes a transmission filter 62T and a reception filter 62R.

The transmission filter 62T is an example of a third filter. One end of the transmission filter 62T is connected to the antenna connection terminal 100 via the switch 51, and the other end is connected to the output terminal of the power amplifier 11. Specifically, the other end of the transmission filter 62T is connected to the output terminal of the power amplifier 11 via the switch 52. The transmission filter 62T has a pass band including at least part of the communication band B. Specifically, the transmission filter 62T has a pass band including an up-link operation band of the communication band B. With this, the transmission filter 62T allows a radio frequency signal in the up-link operation band of the communication band B, in the radio frequency signals amplified by the power amplifier 11, to pass through.

The reception filter 62R is an example of the third filter. One end of the reception filter 62R is connected to the antenna connection terminal 100 via the switch 51, and the other end is connected to the input terminal of the low-noise amplifier 21. Specifically, the other end of the reception filter 62R is connected to the input terminal of the low-noise amplifier 21 via the switch 53. The reception filter 62R has a pass band including at least part of the communication band B. Specifically, the reception filter 62R has a pass band including a down-link operation band of the communication band B. With this, the reception filter 62R allows a radio frequency signal in the down-link operation band of the communication band B, in the radio frequency signals inputted from the antenna connection terminal 100, to pass through.

The duplexer 63 allows a radio frequency signal in the communication band C to pass through. The duplexer 63 transfers a transmission signal and a reception signal in the communication band C by an FDD method. The duplexer 63 includes the transmission filter 63T and the reception filter 63R.

The transmission filter 63T is an example of a fourth filter. One end of the transmission filter 63T is connected to the antenna connection terminal 100 via the switch 51, and the other end is connected to the output terminal of the power amplifier 12. The transmission filter 63T has a pass band including at least part of the communication band C. Specifically, the transmission filter 63T has a pass band including an up-link operation band of the communication band C. With this, the transmission filter 63T allows a radio frequency signal in the up-link operation band of the communication band C, in the radio frequency signals amplified by the power amplifier 12, to pass through.

The reception filter 63R is an example of the fourth filter. One end of the reception filter 63R is connected to the antenna connection terminal 100 via the switch 51, and the other end is connected to the input terminal of the low-noise amplifier 22. The reception filter 63R has a pass band including at least part of the communication band C. Specifically, the reception filter 63R has a pass band including a down-link operation band of the communication band C. With this, the reception filter 63R allows a radio frequency signal in the down-link operation band of the communication band C, in the radio frequency signals inputted from the antenna connection terminal 100, to pass through.

Note that each of the transmission filters 61T to 63T and the reception filters 61R to 63R may be any one of a surface acoustic wave (SAW) filter, an acoustic wave filter using a bulk acoustic wave (BAW), an LC resonant filter, and a dielectric filter, for example, but is not limited thereto.

The switch 51 is an example of a first switch and is connected to the antenna connection terminal 100. Specifically, the switch 51 is connected between the antenna connection terminal 100 and filters, which are the transmission filters 61T to 63T and the reception filters 61R to 63R. The switch 51 switches between (1) a connection of the antenna connection terminal 100, and the transmission filter 61T and the reception filter 61R; (2) a connection of the antenna connection terminal 100, and the transmission filter 62T and the reception filter 62R; and (3) a connection of the antenna connection terminal 100, and the transmission filter 63T and the reception filter 63R. The switch 51 is configured of a multi-connection type switch circuit capable of simultaneously performing two or more connections in (1) to (3) described above.

Specifically, the switch 51 has terminals 511 to 514. The terminal 511 is a common terminal connected to the antenna connection terminal 100. The terminal 512 is a selection terminal connected to the transmission filter 61T and the reception filter 61R. The terminal 513 is a selection terminal connected to the transmission filter 62T and the reception filter 62R. The terminal 514 is a selection terminal connected to the transmission filter 63T and the reception filter 63R. The switch 51 is capable of connecting two or more of the terminals 512 to 514 to the terminal 511 based on a control signal from the RFIC 3, for example.

The switch 52 is an example of a second switch and is connected to the output terminal of the power amplifier 11. Specifically, the switch 52 is connected between the output terminal of the power amplifier 11 and the transmission filters 61T and 62T, for example. The switch 52 switches the connection of the power amplifier 11 and the transmission filter 61T, and the connection of the power amplifier 11 and the transmission filter 62T. Specifically, the switch 52 has terminals 521 to 523. The terminal 521 is a common terminal connected to the output terminal of the power amplifier 11. The terminal 522 is a selection terminal connected to the transmission filter 61T. The terminal 523 is a selection terminal connected to the transmission filter 62T. In the connection configuration described above, the switch 52 is capable of connecting either one of the terminals 522 and 523 to the terminal 521 based on a control signal from the RFIC 3, for example. With this, the connection of the power amplifier 11 and the transmission filter 61T, and the connection of the power amplifier 11 and the transmission filter 62T are switched. The switch 52 is configured of a single-pole double-throw (SPDT) type switch circuit, for example.

The switch 53 is connected between the input terminal of the low-noise amplifier 21 and the reception filters 61R and 62R. The switch 53 switches the connection of the low-noise amplifier 21 and the reception filter 61R, and the connection of the low-noise amplifier 21 and the reception filter 62R. Specifically, the switch 53 has terminals 531 to 533. The terminal 531 is a common terminal connected to the input terminal of the low-noise amplifier 21. The terminal 532 is a selection terminal connected to the reception filter 61R. The terminal 533 is a selection terminal connected to the reception filter 62R. In the connection configuration described above, the switch 53 is capable of connecting either one of the terminals 532 and 533 to the terminal 531 based on a control signal from the RFIC 3, for example. With this, the connection of the low-noise amplifier 21 and the reception filter 61R, and the connection of the low-noise amplifier 21 and the reception filter 62R are switched. The switch 53 is configured of an SPDT type switch circuit, for example.

In the present embodiment, a signal in the communication band C may be transferred simultaneously with a signal in the communication band A. That is, one of combinations of communication bands used in carrier aggregation (CA) includes the communication band A and the communication band C. For example, a transmission signal in the communication band C may be transferred simultaneously with a transmission signal in the communication band A. That is, a simultaneous transfer of a transmission signal (communication band A) passing through the transmission filter 61T, and a transmission signal (communication band C) passing through the transmission filter 63T is possible. Further, for example, a reception signal in the communication band C may be transferred simultaneously with a reception signal in the communication band A. That is, a simultaneous transfer of a reception signal (communication band A) passing through the reception filter 61R, and a reception signal (communication band C) passing through the reception filter 63R is possible.

Further, a signal in the communication band B cannot be transferred simultaneously with a signal in the communication band A. That is, the communication band A and the communication band B are not included in one or more combinations of communication bands used in CA. One of the combinations that are not used in CA includes the communication band A and the communication band B. As an example, a transmission signal in the communication band B cannot be transferred simultaneously with a transmission signal in the communication band A. That is, a simultaneous transfer of a transmission signal (communication band A) passing through the transmission filter 61T, and a transmission signal (communication band B) passing through the transmission filter 62T is not possible. Further, a reception signal in the communication band B cannot be transferred simultaneously with a reception signal in the communication band A. That is, a simultaneous transfer of a reception signal (communication band A) passing through the reception filter 61R, and a reception signal (communication band B) passing through the reception filter 62R is not possible.

As described above, an example has been described in which a simultaneous transfer (simultaneous transmission) of a transmission signal in the communication band A and a transmission signal in the communication band C is possible, and a simultaneous transfer (simultaneous transmission) of a transmission signal in the communication band A and a transmission signal in the communication band B is not possible, but the present disclosure is not limited thereto. For example, a simultaneous transfer (simultaneous transmission) of a transmission signal in the communication band B, and a transmission signal in the communication band C may be possible. Alternatively, a simultaneous transfer (simultaneous transmission and reception) of a reception signal in the communication band A or B, and a transmission signal in the communication band C may be possible. Further, a simultaneous transfer (simultaneous reception) of a reception signal in the communication band A or B, and a reception signal in the communication band C may be possible.

Furthermore, simultaneous transfer of a transmission signal or a reception signal in the communication band A, and a transmission signal or a reception signal in the communication band B may be possible. For example, when a simultaneous transfer of a transmission signal in the communication band A and a transmission signal in the communication band B is possible, the switch 52 is configured of a multi-connection type switch in which the terminal 521 can simultaneously be connected to both the terminals 522 and 523. Further, when a simultaneous transfer of a reception signal in the communication band A and a reception signal in the communication band B is possible, the switch 53 is configured of a multi-connection type switch in which the terminal 531 can simultaneously be connected to both the terminals 532 and 533. Furthermore, a simultaneous transfer of signals in three or more communication bands may be possible.

Moreover, the radio frequency module according to the present disclosure is required to include at least one power amplifier, at least one low-noise amplifier, and at least one switch connected to an antenna connection terminal as a circuit configuration, and is not required to include other circuit elements.

[2. Component Disposition of Radio Frequency Module]

Next, a component disposition of the radio frequency module 1 configured as described above will be specifically described with reference to FIG. 2 to FIG. 5.

Figure 2:
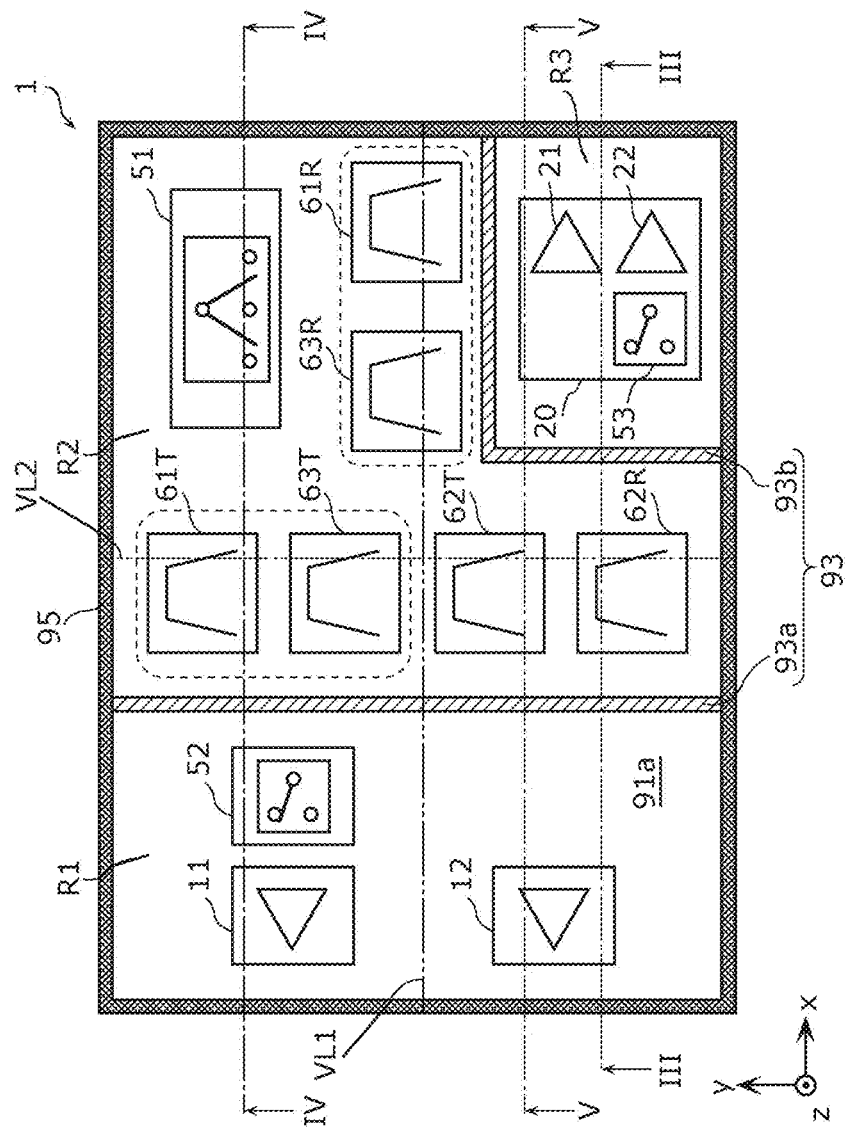
FIG. 2 is a plan view of the radio frequency module according to the embodiment.
Figure 3:
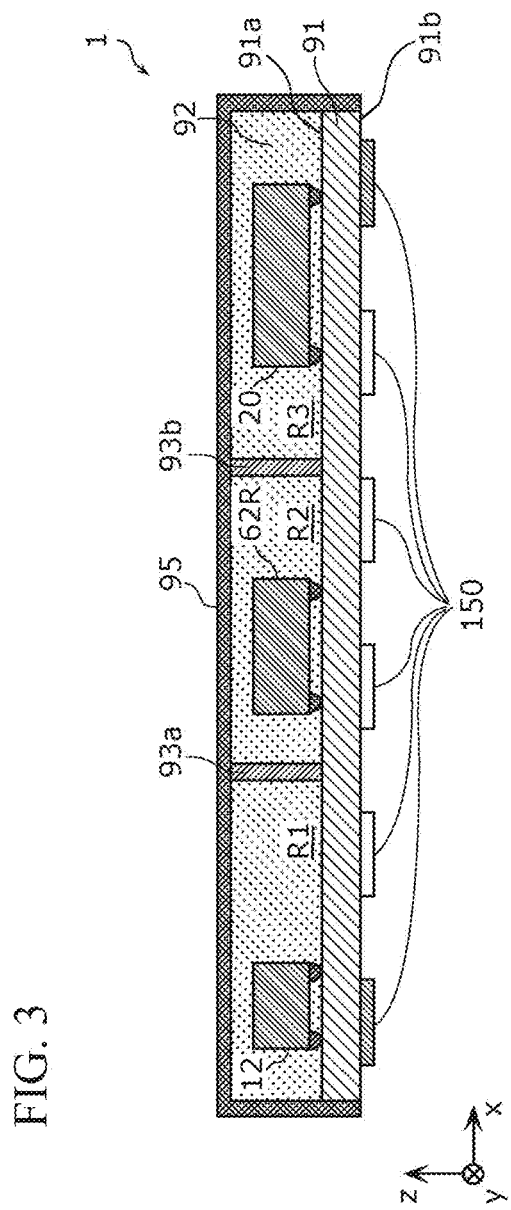
FIG. 3 is a sectional view of the radio frequency module according to the embodiment taken along a line III-III in FIG. 2.
Figure 4:
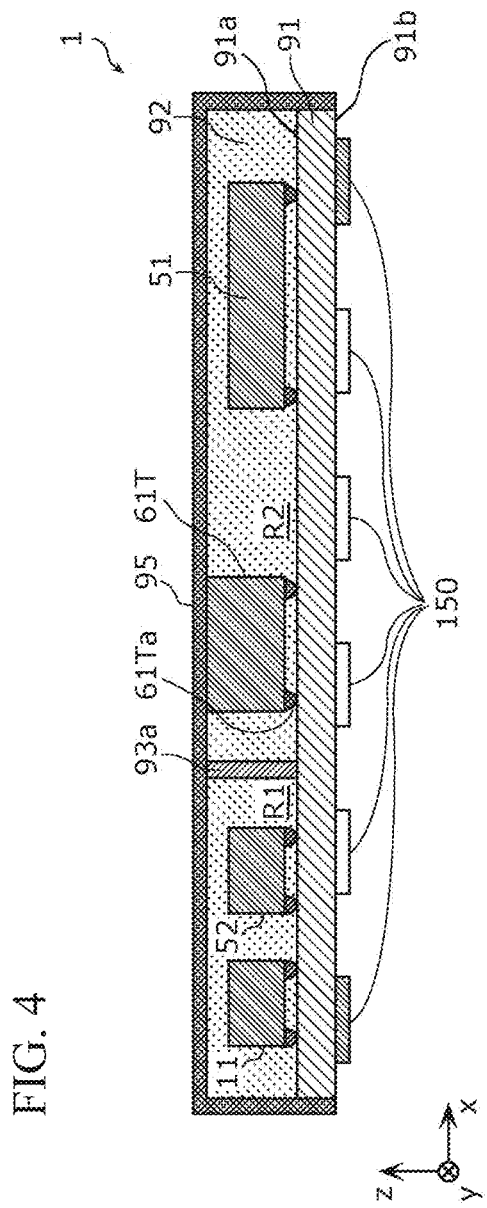
FIG. 4 is a sectional view of the radio frequency module according to the embodiment taken along a line IV-IV in FIG. 2.
Figure 5:
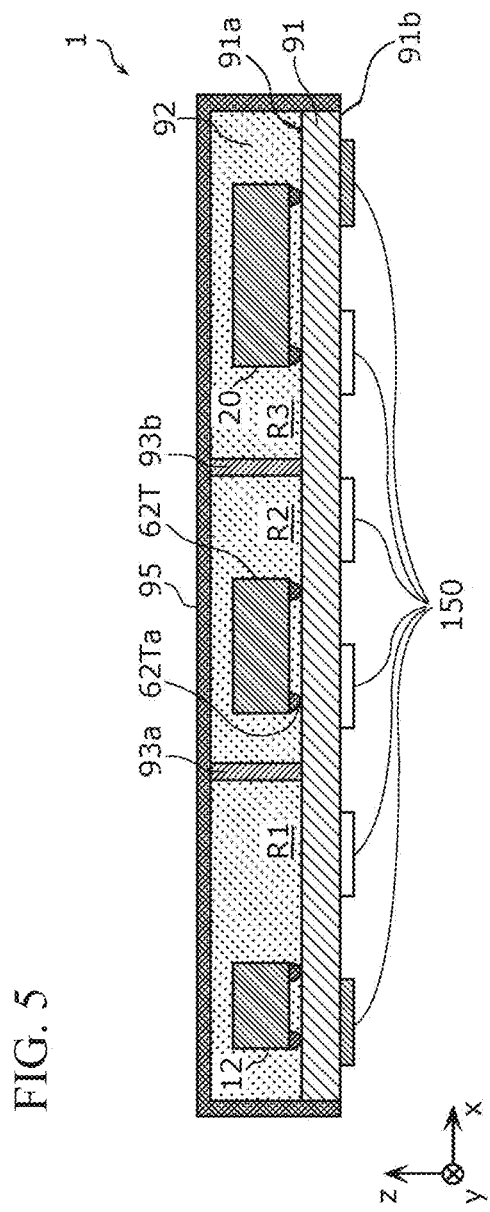
FIG. 5 is a sectional view of the radio frequency module according to the embodiment taken along a line V-V in FIG. 2.

FIG. 2 is a plan view of the radio frequency module 1 according to Embodiment 1. Specifically, FIG. 2 is a drawing of a module substrate 91 viewing a main surface 91a thereof from a z-axis positive side. Each of FIG. 3 to FIG. 5 is a sectional view of the radio frequency module 1 according to Embodiment 1. The section of the radio frequency module 1 in FIG. 3 is a section taken along a line III-III in FIG. 2. The section of the radio frequency module 1 in FIG. 4 is a section taken along a line IV-IV in FIG. 2. The section of the radio frequency module 1 in FIG. 5 is a section taken along a line V-V in FIG. 2.

As illustrated in FIG. 2 and FIG. 3, the radio frequency module 1 further includes a module substrate 91, a resin member 92, a conductive member 93, a shield film 95, and multiple electrode terminals 150, in addition to electronic components including the circuit elements illustrated in FIG. 1. Note that, in FIG. 2, the resin member 92 and an upper portion of the shield film 95 are not illustrated. Further, the conductive member 93 and the side wall portion of the shield film 95 are illustrated with hatching, in order to make the shapes thereof easily understood.

The module substrate 91 has the main surfaces 91a and 91b facing each other. In the present embodiment, a shape of the module substrate 91 in a plan view is rectangular, but is not limited thereto. Components constituting a circuit of the radio frequency module 1 are disposed on the main surfaces 91a and 91b. For the module substrate 91, a low temperature co-fired ceramics (LTCC) substrate having a laminated structure of multiple dielectric layers, a high temperature co-fired ceramics (HTCC) substrate, a component-embedded substrate, a substrate having a redistribution layer (RDL), a printed substrate, or the like may be used, for example, but a substrate for the module substrate 91 is not limited thereto.

The main surface 91a of the module substrate 91 is an example of a first main surface and is referred to as an upper surface or a front surface in some cases. On the main surface 91a, the power amplifiers 11 and 12, the low-noise amplifiers 21 and 22, the switches 51 to 53, the transmission filters 61T to 63T, and the reception filters 61R to 63R are disposed as illustrated in FIG. 2. That is, all of the circuit components (excluding external connection terminals) constituting the radio frequency module 1 are disposed on the main surface 91a. The components on the main surface 91a described above are sealed with a resin member 92 as illustrated in FIG. 3.

The main surface 91b of the module substrate 91 is an example of a second main surface, and is referred to as a lower surface or a rear surface in some cases. On the main surface 91b, the multiple electrode terminals 150 are disposed as illustrated in FIG. 3.

The multiple electrode terminals 150 is an example of the multiple external connection terminals. The multiple electrode terminals 150 include a ground terminal, in addition to the antenna connection terminal 100, the radio frequency input terminals 111 and 112, and the radio frequency output terminals 121 and 122 illustrated in FIG. 1. Each of the multiple electrode terminals 150 is connected to an input/output terminal and/or a ground electrode and the like on a mother substrate disposed on a z-axis negative side of the radio frequency module 1. Pad electrodes may be used as the multiple electrode terminals 150, but multiple electrode terminals 150 are not limited thereto.

The resin member 92 is disposed on the main surface 91a of the module substrate 91, and covers the components disposed on the main surface 91a and the main surface 91a. The resin member 92 has a function of ensuring reliability of mechanical strength, moisture resistance, and the like of each component.

The conductive member 93 partitions the main surface 91a of the module substrate 91 into three regions R1 to R3. Sizes and shapes of the regions R1 to R3 are not particularly limited. A disposition example of components in each of the regions R1 to R3 will be described later.

The conductive member 93 is set to ground electric potential. For example, the conductive member 93 is set to the ground electric potential by being connected to a ground conductor (not illustrated) in the module substrate 91 through a via conductor (not illustrated). Further, the conductive member 93 is set to the ground electric potential by also being connected to the shield film 95. The conductive member 93 protrudes from the main surface 91a. The conductive member 93 suppresses electromagnetic coupling between components disposed in each of the partitioned regions R1 to R3. With this, the inflow of noise into a radio frequency signal transferred through each component may be suppressed.

The conductive member 93 includes a first partition wall 93a and a second partition wall 93b as illustrated in FIG. 2 and FIG. 3. Each of the first partition wall 93a and the second partition wall 93b is formed using a metal material.

The first partition wall 93a is a wall body to partition the region R1 from the region R2. The first partition wall 93a is a long flat plate linearly extending along the y-axis direction, and is in contact with the shield film 95 at side end surfaces of both ends in the y-axis direction as illustrated in FIG. 2. The first partition wall 93a is erected perpendicularly to the main surface 91a, and an upper end surface thereof is in contact with the shield film 95 as illustrated in FIG. 3. Specifically, the entire upper end surface and the entire side end surfaces of the first partition wall 93a are in contact with the shield film 95 such that no gap is formed between the first partition wall 93a and the shield film 95. With this, the region R1 may be completely isolated from the regions R2 and R3.

The second partition wall 93b is a wall body to partition the region R2 from the region R3. The second partition wall 93b is an L-shaped bent plate extending along each of the y-axis direction and the x-axis direction as illustrated in FIG. 2. The second partition wall 93b is in contact with the shield film 95 at each of side end surfaces of the second partition wall 93b. The second partition wall 93b is erected perpendicularly to the main surface 91a, and an upper end surface thereof is in contact with the shield film 95 as illustrated in FIG. 3. Specifically, the entire upper end surface and the entire side end surfaces of the second partition wall 93b are in contact with the shield film 95 such that no gap is formed between the second partition wall 93b and the shield film 95. With this, the region R3 may completely be isolated from the regions R1 and R2.

The first partition wall 93a and the second partition wall 93b are metal bodies plated and grown by a plating method, for example. The first partition wall 93a and the second partition wall 93b may be formed by the following processes, for example.

First, a recess is formed in a predetermined region on the main surface 91a of the module substrate 91 using a photosensitive resist or the like, so that a seed layer serving as a base for plating is exposed. Next, the first partition wall 93a and the second partition wall 93b are simultaneously formed, by growing a metal such as gold or copper on the exposed seed layer by electroplating.

The shield film 95 is a metal thin film formed by a sputtering method, for example, and is formed so as to cover an upper surface and side surfaces of the resin member 92 and side surfaces of the module substrate 91. The shield film 95 is set to the ground electric potential and suppresses the intrusion of external noise into the circuit components constituting the radio frequency module 1.

In the present embodiment, the main surface 91a of the module substrate 91 is partitioned into three regions R1 to R3 by the conductive member 93 as illustrated in FIG. 2. The region R1 is an example of a first region, in which the power amplifiers 11 and 12 are disposed. Further, the switch 52 connected to the output terminal of the power amplifier 11 is disposed in the region R1. The region R1 is a region surrounded by the first partition wall 93a of the conductive member 93 and the shield film 95.

The region R2 is an example of a second region, in which the switch 51 connected to the antenna connection terminal 100 is disposed. Further, the transmission filters 61T to 63T and the reception filters 61R to 63R are disposed in the region R2. The region R2 is a region surrounded by the first partition wall 93a and the second partition wall 93b of the conductive member 93, and the shield film 95.

The transmission filters 61T and 63T are disposed between the switch 51 and the power amplifier 11 in the region R2 in a plan view of the main surface 91a. For example, the transmission filters 61T and 63T are disposed along one side (first side) of the switch 51 having a rectangular shape in a plan view. The first side is the closest side to the power amplifier 11 in four sides of the switch 51.

The transmission filters 61T and 63T respectively correspond to the communication bands in a combination used in CA as described above. Note that, in FIG. 2, a broken line frame represents filters whose pass bands are communication bands used in CA. In the present embodiment, the transmission filters 61T and 63T used in CA are disposed at positions closer to the switch 51 than the transmission filter 62T not used in CA. Specifically, in a plan view, both the shortest distance between the transmission filter 61T and the switch 51 and the shortest distance between the transmission filter 63T and the switch 51, are shorter than the shortest distance between the transmission filter 62T and the switch 51. Note that "the shortest distance between A and B" is the shortest distance among distances connecting any point in A and any point in B.

The transmission filter 61T has multiple connection terminals connected to the main surface 91a. The multiple connection terminals are in contact with wiring lines or electrode pads provided on the main surface 91a, for example. The multiple connection terminals include an input terminal 61Ta as an example of a first terminal being one end of the transmission filter 61T as illustrated in FIG. 4. Further, although not illustrated in FIG. 4, the multiple connection terminals include an output terminal being an example of a second terminal.

The input terminal 61Ta is connected to the output terminal of the power amplifier 11 via the switch 52. A radio frequency signal amplified by the power amplifier 11 is inputted to the input terminal 61Ta. In the present embodiment, the input terminal 61Ta is adjacent to the first partition wall 93a. Note that, in the present description, "terminal A is adjacent to B" means that no other terminal is present between "terminal A" and "B". Specifically, a distance between the first partition wall 93a and the input terminal 61Ta is shorter than a distance between the first partition wall 93a and the output terminal of the transmission filter 61T. The first partition wall 93a is a partition wall closest to the transmission filter 61T in the multiple partition walls constituting the conductive member 93.

More specifically, the distance between the first partition wall 93a and the input terminal 61Ta is the shortest in distances between the first partition wall 93a and each of the multiple connection terminals of the transmission filter 61T. For example, the input terminal 61Ta is positioned closest to the first partition wall 93a in all the connection terminals of the transmission filter 61T. Note that all the connection terminals of the transmission filter 61T may include a connection terminal whose distance to the first partition wall 93a is the same as that of the input terminal 61Ta.

As described above, since the input terminal 61Ta of the transmission filter 61T is adjacent to the first partition wall 93a, heat generated in the transmission filter 61T may be released to the shield film 95 and the ground conductor in the module substrate 91 via the first partition wall 93a, and thus the heat dissipation property may be improved. In particular, when the transmission filter 61T is constituted of SAW filters of multiple stages, a large amount of heat generated in a first stage IDT electrode may efficiently be released, and thus the heat dissipation is highly effective.

Further, the same applies to an input terminal 62Ta of the transmission filter 62T as illustrated in FIG. 5. Specifically, the input terminal 62Ta is adjacent to the first partition wall 93a. Specifically, a distance between the first partition wall 93a and the input terminal 62Ta is shorter than a distance between the first partition wall 93a and the output terminal of the transmission filter 62T. The first partition wall 93a is a partition wall closest to the transmission filter 62T in the multiple partition walls constituting the conductive member 93. More specifically, the distance between the first partition wall 93a and the input terminal 62Ta is the shortest in distances between the first partition wall 93a and each of the multiple connection terminals of the transmission filter 62T.

Further, although not illustrated in the drawing, the input terminal of the transmission filter 63T may also be adjacent to the first partition wall 93a. With this, the heat dissipation effect may be enhanced also in the transmission filters 62T and 63T.

When being surrounded by multiple partition walls (first partition wall 93a and second partition wall 93b) as in a case of the transmission filter 62T, the transmission filter 62T is disposed at a position closer to a partition wall adjacent to the input terminal 62Ta than to a center of a range surrounded by the multiple partition walls, for example. With this, since the input terminal 62Ta is adjacent to one of the multiple partition walls, the heat dissipation effect may be enhanced.

In the present embodiment, the transmission filter 61T may be in contact with the shield film 95 as illustrated in FIG. 4. Specifically, a top surface of the transmission filter 61T is exposed without necessarily being covered by the resin member 92, and the shield film 95 is in contact with and covers the exposed top surface. With this, heat generated in the transmission filter 61T may directly be transferred to the shield film 95, so that the heat dissipation effect may further be enhanced. Note that the top surface of a component is a surface of an opposite side to a surface on a side of a main surface of the module substrate 91, and is a surface positioned on the z-axis positive side in each drawing.

Note that the top surfaces of the transmission filters 62T and 63T may also be in contact with the shield film 95. With this, the heat dissipation effect of the transmission filters 62T and 63T may be enhanced.

The reception filters 61R and 63R are disposed between the switch 51 and the low-noise amplifier 21 in the region R2 in a plan view of the main surface 91a. For example, the reception filters 61R and 63R are disposed along another side (second side) of the switch 51 having a rectangular shape in a plan view. The second side is the side closest to the low-noise amplifier 21 in four sides of the switch 51.

The reception filters 61R and 63R respectively correspond to the communication bands in a combination used in CA as described above. In the present embodiment, the reception filters 61R and 63R used in CA are disposed at positions closer than the reception filter 62R not used in CA to the switch 51. Specifically, in a plan view, both the shortest distance between the reception filter 61R and the switch 51, and the shortest distance between the reception filter 63R and the switch 51, are shorter than the shortest distance between the reception filter 62R and the switch 51.

The transmission filter 62T not used in CA need not be disposed between the power amplifier 11 and the switch 51 as illustrated in FIG. 2. The reception filter 62R not used in CA need not be disposed between the low-noise amplifier 21 and the switch 51.

The region R3 is an example of a third region in which the low-noise amplifiers 21 and 22 are disposed. Further, the switch 53 connected to the input terminal of the low-noise amplifier 21 is disposed in the region R3. The region R3 is a region surrounded by the second partition wall 93b of the conductive member 93 and the shield film 95.

In the present embodiment, the low-noise amplifiers 21 and 22 and the switch 53 are included in one electronic component 20 as illustrated in FIG. 2. The electronic component 20 is one semiconductor integrated circuit, for example. The semiconductor integrated circuit is configured of a complementary metal oxide semiconductor (CMOS), and specifically, may be configured with a silicon on insulator (SOI) process, for example. With this, the semiconductor integrated circuit may be manufactured at low cost. Note that the semiconductor integrated circuit may be made of at least one of GaAs, SiGe, and GaN. With this, it becomes possible to realize a low-noise amplifier having high-quality amplification performance and noise performance.

Note that the main surface 91a may virtually be divided into four regions (quadrants) of an equal size by two virtual straight lines VL1 and VL2 as illustrated in FIG. 2. The straight lines VL1 and VL2 are respectively parallel to two sides of the main surface 91a having a rectangular shape in a plan view. Further, an intersection point of the straight lines VL1 and VL2 coincides with a center of the main surface 91a.

The four virtually divided regions (quadrants) are referred to as first to fourth quadrants in the order of upper right, upper left, lower left, and lower right. All of the first quadrant to the fourth quadrant are regions having an equal size. In the example illustrated in FIG. 2, the switch 51 is disposed in the first quadrant. The power amplifier 11 and the switch 52 are disposed in the second quadrant. The power amplifier 12 is disposed in the third quadrant. The low-noise amplifiers 21 and 22, and the switch 53 are disposed in the fourth quadrant.

Further, the transmission filters 61T to 63T and the reception filter 62R are disposed side by side on the virtual straight line VL2. The reception filters 61R and 63R are disposed side by side on the virtual straight line VL1. In the case above, the transmission filter 62T and the reception filter 62R which are not used in CA are disposed in a lower half region (specifically, a region constituted of the third quadrant and the fourth quadrant) same as the low-noise amplifiers 21 and 22. The transmission filter 61T and 63T used in CA are disposed in an upper half region (specifically, a region constituted of the first quadrant and the second quadrant) same as the switch 51.

Note that the disposition example illustrated in FIG. 2 is merely an example, and the disposition of each component may be changed as appropriate. For example, the power amplifier 12 may be disposed in the second quadrant same as the power amplifier 11. Further, at least one of the transmission filters 61T to 63T and the reception filters 61R to 63R may be disposed not on the straight lines VL1 and VL2 but in any one of the first quadrant to the fourth quadrant.

[3. Effects and the Like]

As described above, the radio frequency module 1 according to the present embodiment includes: the module substrate 91 having the main surface 91a; the conductive member 93 to partition the main surface 91a into the region R1, the region R2, and the region R3 in a plan view of the main surface 91a, and being set to the ground electric potential; the switch 51 disposed in the region R2 and connected to the antenna connection terminal 100; the power amplifier 11 disposed in the region R1 and connected to the antenna connection terminal 100 via the switch 51; and the low-noise amplifier 21 disposed in the region R3 and connected to the antenna connection terminal 100 via the switch 51.

With this, the power amplifier 11, the low-noise amplifier 21, and the switch 51 (antenna switch) are respectively disposed in regions different from each other, and electromagnetic coupling therebetween may be suppressed by the conductive member 93. For this reason, the inflow of noise into a radio frequency signal processed by each element may be suppressed.

Further, for example, the radio frequency module 1 further includes a transmission filter 61T: having a pass band including at least part of the communication band A; and having one end connected to the antenna connection terminal 100 via the switch 51, and the other end connected to the output terminal of the power amplifier 11. The transmission filter 61T is disposed between the switch 51 and the power amplifier 11 in the region R2 in a plan view.

With this, a wiring line length from the power amplifier 11 to the switch 51 via the transmission filter 61T may be shortened. Further, by disposing the switch 51 and the transmission filter 61T in the same region R2, a wiring line length between the switch 51 and the transmission filter 61T may further be shortened. For example, when the transmission filter 61T constitutes the duplexer 61 together with the reception filter 61R, both a transmission signal and a reception signal are transferred between the switch 51 and the transmission filter 61T. Accordingly, since lengths of wiring lines between elements through which both a transmission signal and a reception signal are transferred may be shortened, the influence of stray capacitance or the like of these wiring lines may be suppressed, and thus the deterioration of loss characteristics may be suppressed. Further, since electric field coupling, magnetic field coupling, or electromagnetic field coupling between these wiring lines and circuit components, other wiring lines, or the like may be suppressed, the deterioration of isolation characteristics between transmission and reception may be suppressed. As described above, according to the radio frequency module 1 of the present embodiment, the inflow of noise into a radio frequency signal may be suppressed and the electrical characteristics may be improved.

Further, for example, the transmission filter 61T has multiple connection terminals connected to the main surface 91a. The multiple connection terminals include the input terminal 61Ta and other terminals. In a plan view, a distance between the conductive member 93 and the input terminal 61Ta is shorter than distances between the conductive member 93 and other terminals described above. Further, for example, in a plan view, the distance between the conductive member 93 and the input terminal 61Ta may be the shortest in distances between the conductive member 93 and each of the multiple connection terminals of the transmission filter 61T.

As described above, since the input terminal 61Ta of the transmission filter 61T is adjacent to the conductive member 93, heat generated in the transmission filter 61T may be released to the shield film 95 and the ground conductor in the module substrate 91 via the conductive member 93, and thus the heat dissipation property may be improved.

Further, for example, the radio frequency module 1 further includes a reception filter 61R: having a pass band including at least part of the communication band A; and having one end connected to the antenna connection terminal 100 via the switch 51, and the other end connected to the input terminal of the low-noise amplifier 21. The reception filter 61R is disposed between the switch 51 and the low-noise amplifier 21 in the region R2 in a plan view.

With this, a wiring line length from the switch 51 to the low-noise amplifier 21 via the reception filter 61R may be shortened. Further, by disposing the switch 51 and the reception filter 61R in the same region R2, a distance between the switch 51 and the reception filter 61R may be shortened. With this, since the influence of stray capacitance and stray inductance generated in a wiring line may be suppressed, the inflow of noise into a radio frequency signal may be suppressed, and thus the electrical characteristics of the radio frequency module 1 may be improved.

Further, for example, the radio frequency module 1 further includes the transmission filter 62T or the reception filter 62R having a pass band including at least part of the communication band B different from the communication band A and having one end connected to the antenna connection terminal 100 via the switch 51, and the transmission filter 63T or the reception filter 63R having a pass band including at least part of the communication band C different from the communication bands A and B and having one end connected to the antenna connection terminal 100 via the switch 51. A signal in the communication band B cannot be transferred simultaneously with a signal in the communication band A. A signal in the communication band C can be transferred simultaneously with a signal in the communication band A. The transmission filter 63T (or reception filter 63R) is disposed at a position where a distance between the transmission filter 63T (or reception filter 63R) and the switch 51 is shorter than a distance between the transmission filter 62T (or reception filter 62R) and the switch 51, in the region R2 in a plan view.

With this, since the filters used in CA (transmission filters 61T and 63T, and reception filters 61R and 63R, for example) are disposed at positions closer than the filters not used in CA (transmission filter 62T and reception filter 62R, for example) to the switch 51, wiring line lengths between the filters used in CA and the switch 51 may be shortened. For this reason, the inflow of noise into a radio frequency signal in the communication bands used in CA may be suppressed.

Further, for example, the radio frequency module 1 further includes the switch 52 connected to the output terminal of the power amplifier 11. The transmission filter 62T is connected to the output terminal of the power amplifier 11 via the switch 52. The switch 52 is disposed in the region R1.

With this, the switch 52 through which a transmission signal passes and the power amplifiers 11 and 12 are disposed in the same region R1, and are isolated from the region R3 in which the low-noise amplifiers 21 and 22 are disposed. Accordingly, the isolation characteristics between transmission and reception may be enhanced, and the inflow of noise into a radio frequency signal may be suppressed.

Further, for example, when the main surface 91a is virtually divided into two regions of an equal size by one straight line VL1, the power amplifier 11, the switch 51, and the transmission filter 63T are disposed in one of the two regions, and the low-noise amplifier 21 and the transmission filter 62T are disposed in the other of the two regions.

With this, wiring line lengths between the filters used in CA and the switch 51 may be shortened. For this reason, the inflow of noise into a radio frequency signal in the communication bands used in CA may be suppressed.

Further, for example, when the main surface 91a is virtually divided into four regions of an equal size by two straight lines VL1 and VL2, the power amplifier 11 and the switch 51 are disposed in two adjacent regions, respectively, and the low-noise amplifier 21 is disposed in a region diagonally positioned to the region in which the power amplifier 11 is disposed.

With this, since the power amplifier 11 and the low-noise amplifier 21 may be separated relatively far from each other, the isolation characteristics between transmission and reception may be enhanced, and the inflow of noise into a radio frequency signal may be suppressed.

Further, for example, the radio frequency module 1 further includes: the resin member 92 to cover the power amplifier 11, the low-noise amplifier 21, the switch 51, and the main surface 91a; and a shield film 95 to cover a surface of the resin member 92. The conductive member 93 is in contact with the shield film 95.

With this, the shielding performance between the regions by the conductive member 93 may be enhanced, and thus the inflow of noise may be suppressed.

Further, the communication device 5 according to the present embodiment includes the RFIC 3 to process a radio frequency signal, and the radio frequency module 1 to transfer the radio frequency signal processed by the RFIC 3.

With this, the effects equivalent to those of the above-described radio frequency module 1 may be obtained.

(Others)

Although the radio frequency module and the communication device according to the present disclosure have been described based on the embodiments, the present disclosure is not limited to the embodiments.

For example, in the circuit configuration of the radio frequency module and the communication device according to each of the embodiments, another circuit element, a wiring line, or the like may be inserted between paths connecting the circuit elements and the signal paths disclosed in the drawings. For example, an impedance matching circuit may be inserted into at least one of between the duplexer 61 and the switch 51, between the duplexer 62 and the switch 51, and between the duplexer 63 and the switch 51. Further, an impedance matching circuit may be inserted into at least one of between the power amplifier 11 and the switch 52, between the low-noise amplifier 21 and the switch 53, between the power amplifier 12 and the transmission filter 63T, and between the low-noise amplifier 22 and the reception filter 63R, for example. An impedance matching circuit may be constituted of an inductor and/or a capacitor, for example.

Further, for example, the radio frequency module 1 may have multiple antenna connection terminals, and the communication device 5 may include multiple antennas.

Further, for example, at least one of the transmission filters 61T to 63T and the reception filters 61R to 63R may be disposed in a region different from the region R2 in which the switch 51 is disposed. For example, at least one of the transmission filters 61T to 63T may be disposed in the region R1 in which the power amplifier 11 is disposed. At least one of the reception filters 61R to 63R may be disposed in the region R3 in which the low-noise amplifier 21 is disposed.

Further, for example, although the main surface 91a of the module substrate 91 is partitioned into three regions in the embodiment, the present disclosure is not limited thereto. For example, the main surface 91a may be partitioned into four or more regions. For example, at least one of the switches 52 and 53, the transmission filters 61T to 63T, and the reception filters 61R to 63R may be disposed in a region different from any of the regions R1 to R3.

Further, for example, the shape and size of each of the first partition wall 93a and the second partition wall 93b are not particularly limited. For example, the first partition wall 93a may extend in a direction oblique to or perpendicular to the y-axis direction, or may meander along the y-axis direction. Further, the first partition wall 93a may have an L-shape in a plan view as same as the second partition wall 93b. The second partition wall 93b may linearly extend along the y-axis direction, or may extend in a direction oblique to or perpendicular to the y-axis direction. Further, the first partition wall 93a may be an annular wall body surrounding at least the periphery of the power amplifier 11. The second partition wall 93b may be an annular wall body surrounding at least the periphery of the low-noise amplifier 21.

Further, each of the first partition wall 93a and the second partition wall 93b need not be in contact with the shield film 95. Furthermore, each of the first partition wall 93a and the second partition wall 93b may be provided with one or more through-holes or one or more slits penetrating through the wall body. The shape of a slit may be a shape cut out downward from an upper end of the wall body or a shape cut out upward from a lower end of the wall body, for example. Alternatively, the shape of a slit may be a shape cut out from a side end surface (contact surface with shield film 95) of the wall body in a direction parallel to the main surface 91a or in a direction oblique to the main surface 91a.

Further, each of the first partition wall 93a and the second partition wall 93b may be configured of multiple partial wall bodies isolated from each other. Hereinafter, modifications of each of the first partition wall 93a and the second partition wall 93b will be described with reference to FIG. 6 to FIG. 11. FIG. 6 to FIG. 11 each is a plan view of a radio frequency module according to Modification 1 to Modification 6. Modification 1 to Modification 6 are the same as the embodiment described above other than the shapes of the first partition wall 93a and the second partition wall 93b in a plan view.

Figure 6:
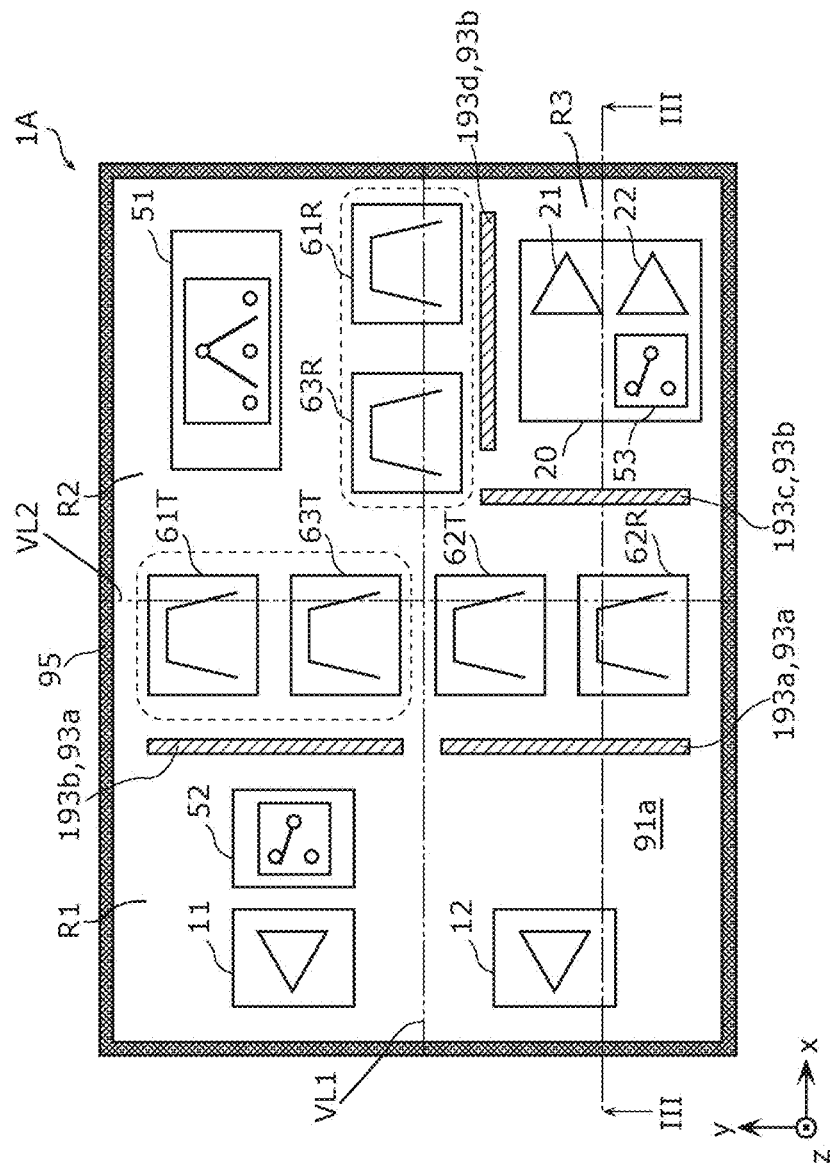
FIG. 6 is a plan view of a radio frequency module according to Modification 1.

For example, as in a radio frequency module 1A of FIG. 6, each of the first partition wall 93a and the second partition wall 93b may be configured of multiple partial wall bodies disposed apart from each other. A shape of each of the first partition wall 93a and the second partition wall 93b in a plan view may be a dotted line shape or a broken line shape having a predetermined line width.

Note that, when a partition wall is configured of multiple partial wall bodies or when a partition wall does not extend to a side surface portion of the shield film 95, each region may virtually be sectioned by a virtual straight line extending in a predetermined direction from an end portion of a partition wall or a partial wall body. The virtual straight line is, as an example, an extension line of a partition wall or a partial wall body.

In the radio frequency module 1A illustrated in FIG. 6, the first partition wall 93a includes two partial wall bodies 193a and 193b. The two partial wall bodies 193a and 193b have an elongated shape extending in the y-axis direction and are linearly disposed side by side along the y-axis direction. Each of the partial wall bodies 193a and 193b is not in contact with the side surface portion of the shield film 95, and is provided with a gap inbetween.

The second partition wall 93b includes two partial wall bodies 193c and 193d. The partial wall body 193c has an elongated shape extending along the y-axis direction. The partial wall body 193d has an elongated shape extending along the x-axis direction. The partial wall bodies 193c and 193d are not in contact with each other, and are disposed apart from each other. Further, each of the partial wall bodies 193c and 193d is not in contact with the side surface portion of the shield film 95, and is provided with a gap inbetween.

Even in the case above, sectioning into the regions R1 to R3 may be possible same as in the embodiment. The regions R1 to R3 need not completely be isolated from each other, and may partially be communicated with each other with a gap between partition walls.

Figure 7:
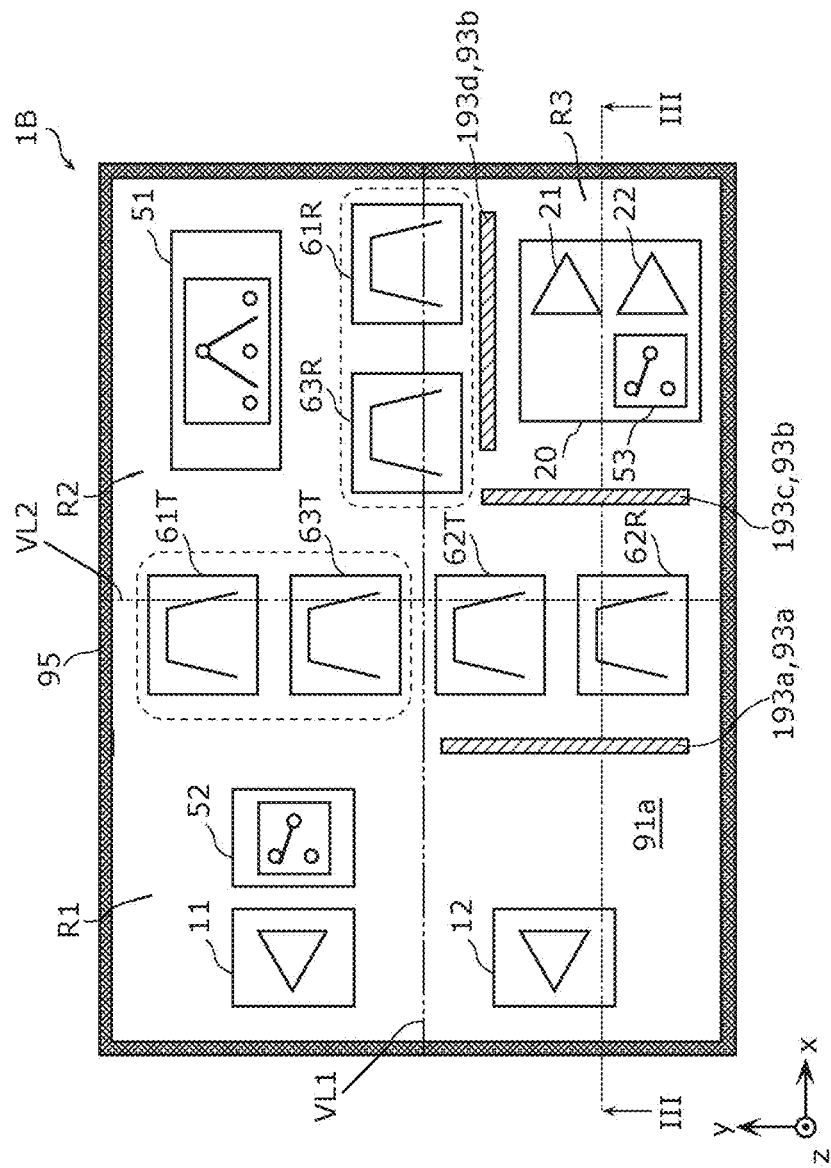
FIG. 7 is a plan view of a radio frequency module according to Modification 2.

Further, as in a radio frequency module 1B illustrated in FIG. 7, the first partition wall 93a may include only the partial wall body 193a without necessarily including the partial wall body 193b. The radio frequency module 1B corresponds to a configuration in which the partial wall body 193b is removed from the radio frequency module 1A of FIG. 6. In the case above, sectioning into the region R1 and the region R2 may be made with an extension line (extending in y-axis direction) of the partial wall body 193a.

Figure 8:
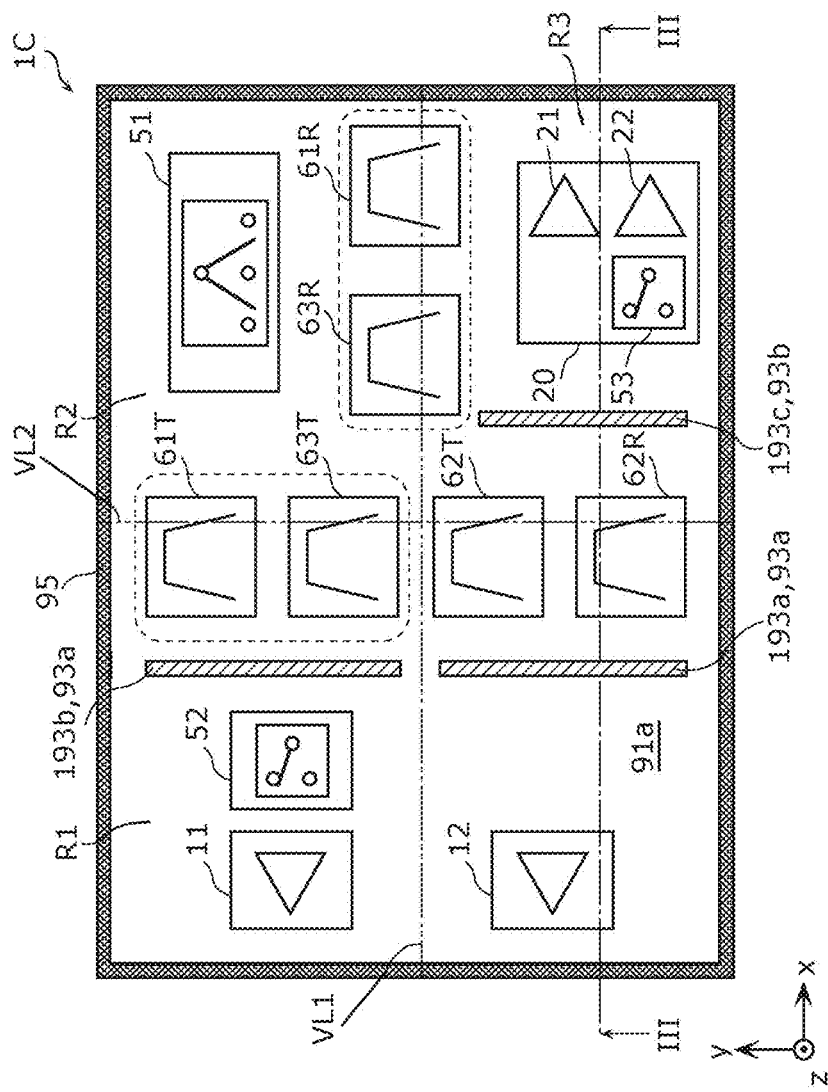
FIG. 8 is a plan view of a radio frequency module according to Modification 3.

Further, as in a radio frequency module 1C illustrated in FIG. 8, the second partition wall 93b may include only the partial wall body 193c without necessarily including the partial wall body 193d. The radio frequency module 1C corresponds to a configuration in which the partial wall body 193d is removed from the radio frequency module 1A of FIG. 6. In the case above, sectioning into the region R2 and the region R3 may be made with an extension line of the partial wall body 193c and a virtual line extending in the x-axis direction from an end portion of the partial wall body 193c in the y-axis direction.

Figure 9:
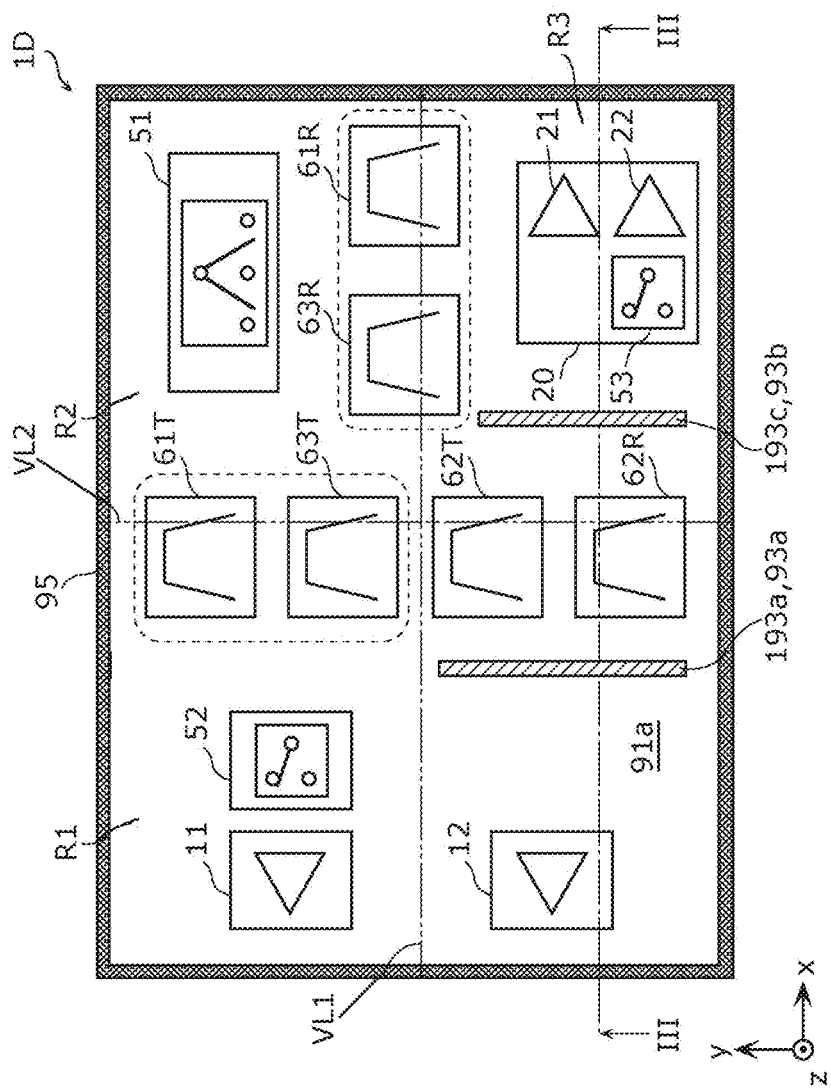
FIG. 9 is a plan view of a radio frequency module according to Modification 4.

Further, as in a radio frequency module 1D illustrated in FIG. 9, the first partition wall 93a may include only the partial wall body 193a without necessarily including the partial wall body 193b. The second partition wall 93b may include only the partial wall body 193c without necessarily including the partial wall body 193d. The radio frequency module 1D corresponds to a configuration in which the partial wall bodies 193b and 193d are removed from the radio frequency module 1A of FIG. 6.

Figure 10:
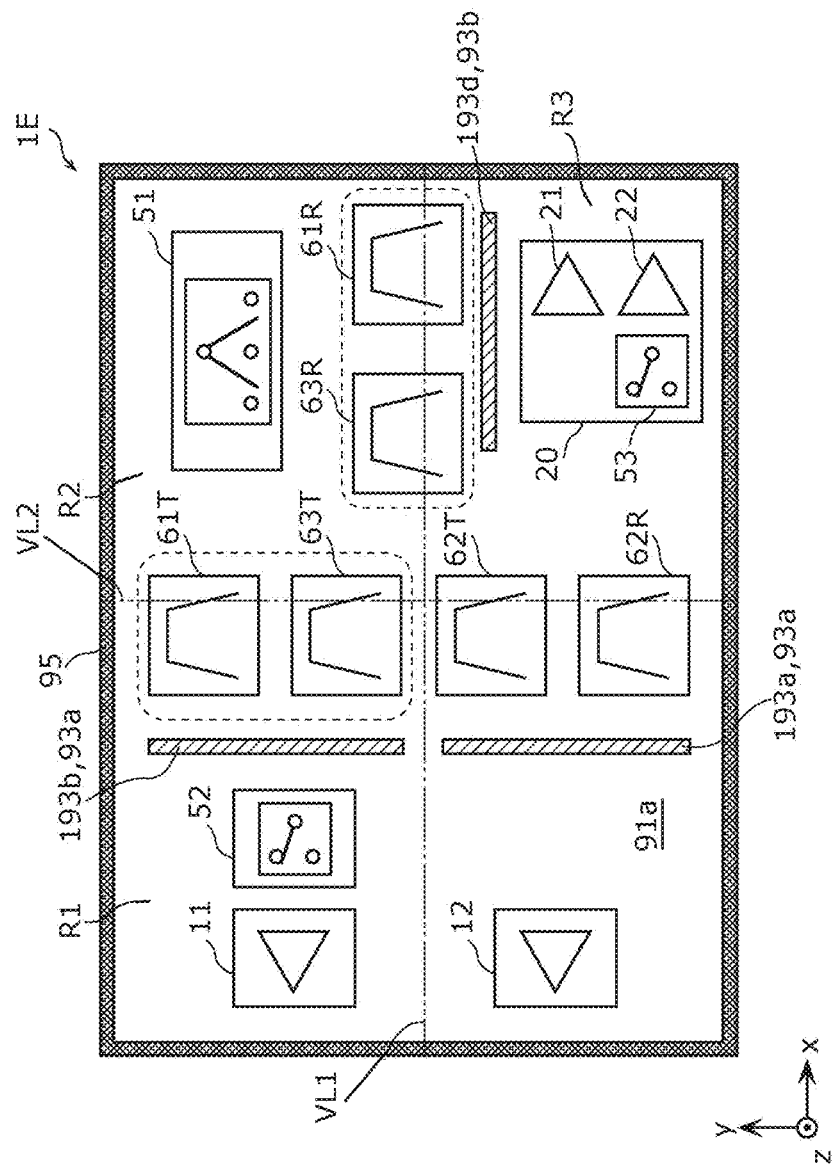
FIG. 10 is a plan view of a radio frequency module according to Modification 5.

Further, as in a radio frequency module 1E illustrated in FIG. 10, the second partition wall 93b may include only the partial wall body 193d without necessarily including the partial wall body 193c. The radio frequency module 1E corresponds to a configuration in which the partial wall body 193c is removed from the radio frequency module 1A of FIG. 6.

Figure 11:
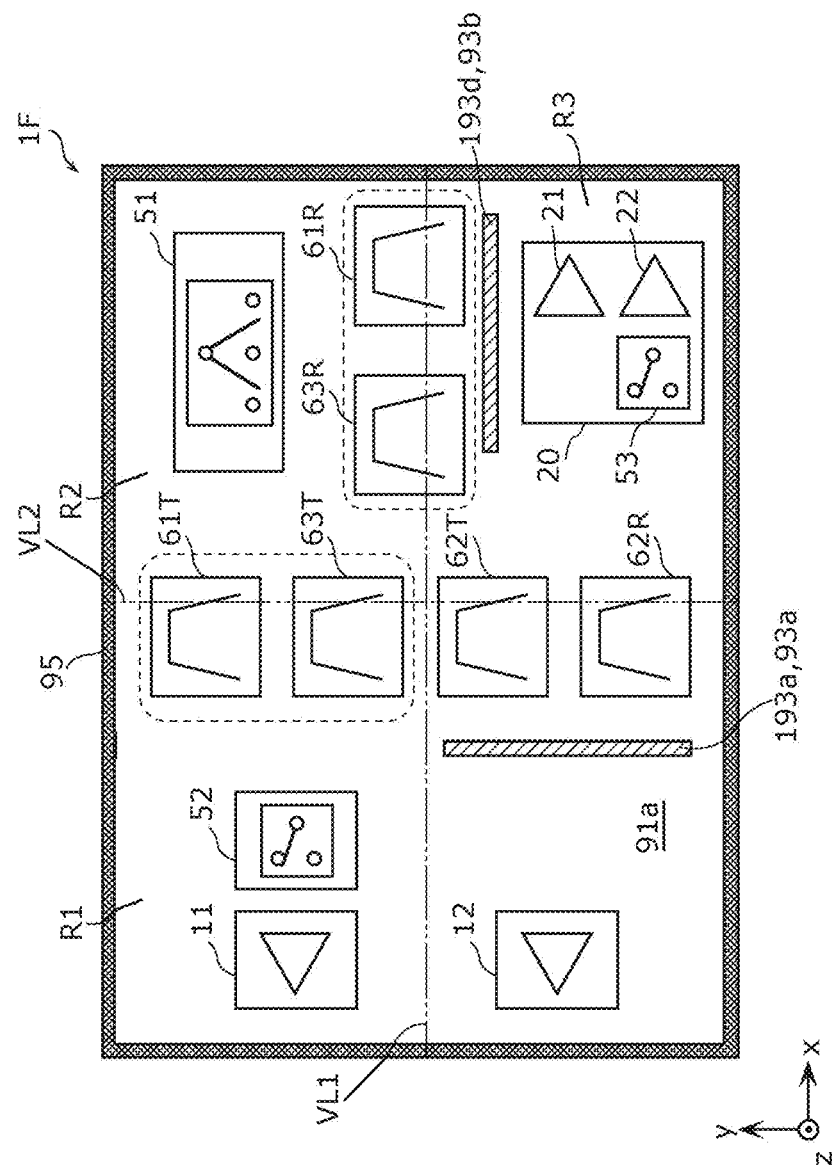
FIG. 11 is a plan view of a radio frequency module according to Modification 6.

Further, as in a radio frequency module 1F illustrated in FIG. 11, the first partition wall 93a may include only the partial wall body 193a without necessarily including the partial wall body 193b. The second partition wall 93b may include only the partial wall body 193d without necessarily including the partial wall body 193c. The radio frequency module 1F corresponds to a configuration in which the partial wall bodies 193b and 193c are removed from the radio frequency module 1A of FIG. 6.

Also, in the cases above, as in the cases of FIG. 7 and FIG. 8, sectioning into the regions R1 to R3 may be possible. Note that, in Modification 2, Modification 4, or Modification 6, the partial wall body 193b may be provided instead of the partial wall body 193a.

Note that each of the first partition wall 93a and the second partition wall 93b may be formed by applying a metal paste and curing the applied metal paste. Further, each of the first partition wall 93a and the second partition wall 93b may be formed by forming a gap corresponding to a partition wall in the resin member 92, and then filling the gap with a metal by a sputtering method. Alternatively, each of the first partition wall 93a and the second partition wall 93b may be formed by fixing a plate-shaped member made of metal to the main surface 91a with solder.

Further, for example, in the embodiment described above, there has been described an example in which all of the components constituting the circuit of the radio frequency module 1 are mounted on the main surface 91a of the module substrate 91, that is, an example in which single-sided mounting on the module substrate 91 is performed, but the present disclosure is not limited thereto. For example, the components may be mounted on both surfaces of the module substrate 91. For example, one of the switches 52 and 53 may be mounted on the main surface 91b of the module substrate 91. When a component is mounted on the main surface 91b, a resin member to cover the component may be provided. In the case above, the electrode terminal 150 may be a post electrode penetrating through the resin member. Alternatively, the electrode terminal 150 may be a bump electrode. When the radio frequency module 1 includes an impedance matching circuit, the impedance matching circuit may be disposed on the main surface 91a or may be disposed on the main surface 91b.

Note that, when the single-sided mounting is performed on the module substrate 91, the main surface used for the single-sided mounting may be the main surface 91b of the module substrate 91. That is, the main surface 91b may be partitioned into three or more regions by the conductive member 93, and the power amplifier 11, the switch 51, and the low-noise amplifier 21 may respectively be disposed in each region.

In addition, an embodiment obtained by applying various modifications conceived by those skilled in the art to each embodiment, and an embodiment achieved by combining constituents and functions in each embodiment as desired without necessarily departing from the gist of the present disclosure are also included in the present disclosure.

INDUSTRIAL APPLICABILITY

The present disclosure may be used in a communication device or the like, such as a cellular phone, as a radio frequency module disposed in a front end portion.

REFERENCE SIGNS LIST 1, 1A, 1B, 1C, 1D, 1E, 1F Radio Frequency Module
2 Antenna

3 RFIC
4 BBIC
5 Communication Device
11, 12 Power Amplifier
20 Electronic Component
21, 22 Low-Noise Amplifier
51, 52, 53 Switch
61, 62, 63 Duplexer
61T, 62T, 63T Transmission Filter
61Ta, 62Ta Input Terminal
61R, 62R, 63R Reception Filter
91 Module Substrate
91a, 91b Main Surface
92 Resin Member
93 Conductive Member
93a First Partition Wall
93b Second Partition Wall
95 Shield Film
100 Antenna Connection Terminal
111, 112 Radio Frequency Input Terminal
121, 122 Radio Frequency Output Terminal
150 Electrode Terminal
193a, 193b, 193c, 193d Partial Wall Body
511, 512, 513, 514, 521, 522, 523, 531, 532, 533 Terminal
R1, R2, R3 Region
VL1, VL2 Straight Line

The invention claimed is:

1. A radio frequency module, comprising:
a module substrate having a first main surface;
a first switch having a common terminal, a first selection terminal, and a second selection terminal, and being disposed on the module substrate;
a power amplifier connected to the first selection terminal, and disposed on the module substrate;
a low noise amplifier connected to the second selection terminal, and disposed on the module substrate;
a first conductor at a ground electric potential, and having a portion that extends perpendicularly to the first main surface;
a resin that covers at least a portion of the first main surface, and at least a portion of the first conductor; and
a shield disposed on the resin;
wherein the first conductor is in contact with the shield, and
wherein in a plan view of the module substrate:
the first conductor has a portion that linearly extends along a first direction on the first main surface, and
the first conductor is disposed between the power amplifier and the first switch, or between the power amplifier and the low noise amplifier, or between the low noise amplifier and the first switch.

2. The radio frequency module according to claim 1, wherein the first conductor comprises one or more through-holes or one or more slits penetrating through the first conductor.

3. The radio frequency module according to claim 2, wherein the first conductor is disposed between the power amplifier and the first switch, and between the power amplifier and the low noise amplifier, in the plan view of the module substrate.

4. The radio frequency module according to claim 2,
wherein the first conductor has a first portion and a second portion orthogonal to the first portion, and
wherein the first portion and the second portion form an L-shape in the plan view of the module substrate.

5. The radio frequency module according to claim 1, further comprising:
a second conductor at the ground electric potential, and having a portion extending perpendicularly to the first main surface,
wherein the second conductor is in contact with the shield, and has a portion that linearly extends along a second direction on the first main surface in the plan view of the module substrate.

6. The radio frequency module according to claim 5, wherein the first direction and the second direction are orthogonal.

7. The radio frequency module according to claim 6, wherein in the plan view of the module substrate:
the first conductor is disposed between the low noise amplifier and the power amplifier, and
the second conductor is disposed between the low noise amplifier and the first switch, in the plan view of the module substrate.

8. The radio frequency module according to claim 5, wherein in the plan view of the module substrate:
the first direction overlaps the second conductor, and
the second direction overlaps the first conductor.

9. The radio frequency module according to claim 8, wherein in the plan view of the module substrate:
the first conductor is disposed between the power amplifier and the first switch, and
the second conductor is disposed between the power amplifier and the low noise amplifier.

10. The radio frequency module according to claim 5, wherein in the plan view of the module substrate:
the first conductor is disposed between the power amplifier and the first switch, and between the power amplifier and the low noise amplifier, and
the second conductor is disposed between the low noise amplifier and the first switch.

11. The radio frequency module according to claim 10, further comprising:
a first transmission filter connected between the first switch and the power amplifier; and
a first reception filter connected between the first switch and the low noise amplifier,
wherein in the plan view of the module substrate:
the first transmission filter is disposed between the power amplifier and the first switch, and
the first reception filter is disposed between the first switch and the low noise amplifier.

12. The radio frequency module according to claim 11, wherein in the plan view of the module substrate:
the first conductor is disposed between the power amplifier and the first transmission filter, and
the second conductor is disposed between the first reception filter and the low noise amplifier.

13. The radio frequency module according to claim 5,
wherein the first conductor has a first portion and a second portion orthogonal to the first portion, and
wherein in the plan view of the module substrate:
the first portion and the second portion form an L-shape,
the first portion is disposed between the low noise amplifier and the first switch,
the second portion is disposed between the low noise amplifier and the power amplifier, and
the second conductor is disposed between the power amplifier and the first switch.

14. The radio frequency module according to claim 13, further comprising:
a first transmission filter connected between the first switch and the power amplifier; and a first reception filter connected between the first switch and the low noise amplifier, wherein in the plan view of the module substrate:
the first transmission filter is disposed between the power amplifier and the first switch, and
the first reception filter is disposed between the first switch and the low noise amplifier.

15. The radio frequency module according to claim 14, wherein in the plan view of the module substrate:
the first conductor is disposed between the power amplifier and the first transmission filter, and
the second conductor is disposed between the first reception filter and the low noise amplifier.

16. The radio frequency module according to claim 5, further comprising:
a third conductor at the ground electric potential, and having a portion that extends perpendicularly to the first main surface,
wherein in the plan view of the module substrate the third conductor is in contact with the shield, and has a portion that linearly extends along a third direction on the first main surface.

17. The radio frequency module according to claim 16, wherein in the plan view of the module substrate:
the first conductor is disposed between the power amplifier and the first switch,
the second conductor is disposed between the power amplifier and the low noise amplifier, and
the third conductor is disposed between the low noise amplifier and the first switch.

18. The radio frequency module according to claim 17, further comprising:
a first transmission filter connected between the first switch and the power amplifier; and
a first reception filter connected between the first switch and the low noise amplifier,
wherein in the plan view of the module substrate:
the first transmission filter is disposed between the power amplifier and the first switch, and
the first reception filter is disposed between the first switch and the low noise amplifier.

19. The radio frequency module according to claim 18, further comprising:
a second transmission filter connected between the first switch and the power amplifier,
wherein in the plan view of the module substrate:
the first conductor is disposed between the power amplifier and the first transmission filter,
the second conductor is disposed between the first reception filter and the low noise amplifier, and
the third conductor is disposed between the power amplifier and the second transmission filter.

* * * * *